United States Patent
Joslin et al.

(10) Patent No.: US 8,411,969 B1
(45) Date of Patent: Apr. 2, 2013

(54) METHOD FOR FUSING OVERHEAD IMAGERY WITH AUTOMATIC VESSEL REPORTING SYSTEMS

(75) Inventors: Erin Joslin, San Diego, CA (US); Matthew Waller, San Diego, CA (US); Heidi Buck, San Diego, CA (US); Jerry Fu, San Diego, CA (US); Stephen Hobbs, San Diego, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 484 days.

(21) Appl. No.: 12/851,738

(22) Filed: Aug. 6, 2010

(51) Int. Cl.
*G06K 9/62* (2006.01)
*G06K 9/00* (2006.01)
*G06K 9/46* (2006.01)

(52) U.S. Cl. ........ 382/224; 382/103; 382/107; 382/190; 382/181

(58) Field of Classification Search .................. None
See application file for complete search history.

(56) References Cited

PUBLICATIONS

Tunaley, "Algorithms for ship detection and tracking using satellite imagery", Geoscience and Remote Sensing Symposium, 2004. IGARSS '04. Proceedings. 2004 IEEE International, vol. 3 pp. 1804-1807 vol. 3.*

Vachon, "Ship Detection in Synthetic Aperture Radar Imagery", proceedings oceansar 2006—third workshop on coastal and marine applications of sar, st. john's, nl, canada, Oct. 2006, p. 1-10.*

Eldhuset, "An automatic ship and ship wake detection system for spaceborne SAR images in coastal regions ", Geoscience and Remote Sensing, IEEE Transactions on, 1996, vol. 34 , Issue: 4 pp. 1010-1019.*

Tsagaris et al., "Using synthetic aperture radar data to detect and identify ships", Mar. 9, 2008, SPIE Newsroom. DOI: 10.1117/2. 1200802.1062 , p. 1-2.*

Unpublished U.S. Appl. No. 12/197,421, by Heidi Buck et al., entitled "Ship Detection System and Method from Overhead Images", filed Aug. 25, 2008.

* cited by examiner

*Primary Examiner* — Tom Y Lu
*Assistant Examiner* — Thomas Conway
(74) *Attorney, Agent, or Firm* — Arthur K. Samora; Kyle Eppele

(57) ABSTRACT

Systems and methods for processing satellite imagery include a satellite, a processor, a database of vessel position data and a computer readable storage medium. The methods process satellite imagery by fusing the imagery with information from the database to automatically identify ships. The methods include the steps of defining an Area of Interest (AOI) and Time of Interest (TOI) for the image and enlarging the AOI according to a time window that brackets the TOI and an assumed vessel maximum speed. Vessel position data from the database for all vessels within the enlarged AOI and the time window is accessed, and fused to imagery position data using Chi-Squared probability analysis. If the analysis meets predetermined probability threshold criteria, the vessel position is assigned to the satellite image to identify the vessel. Otherwise, the operator is alerted that imaged vessels do not correlate to vessel reporting data, or vice versa.

20 Claims, 7 Drawing Sheets
(2 of 7 Drawing Sheet(s) Filed in Color)

METHOD FOR FUSING OVERHEAD IMAGERY WITH AUTOMATIC VESSEL REPORTING SYSTEMS

FEDERALLY-SPONSORED RESEARCH AND DEVELOPMENT

This invention (Navy Case No. 099846) is assigned to the United States Government and is available for licensing for commercial purposes. Licensing and technical inquires may be directed to the Office of Research and Technical Applications, Space and Naval Warfare Systems Center, San Diego, Code 72120, San Diego, Calif. 92152; voice (619) 553-2778; email T2@spawar.navy.mil.

FIELD OF THE INVENTION

The present invention applies generally to the identification of vessels that have been detected by satellites. More specifically, some embodiments of the invention pertain to the automatic fusion of vessel satellite imagery with vessel data from other sources to quickly and efficiently identify detected vessels.

BACKGROUND OF THE INVENTION

The automatic identification system (AIS) is a short range coastal tracking system used on ships and by vessel traffic services (VTS) for identifying and locating vessels. AIS accomplishes this by electronically exchanging data with other nearby ships and VTS stations. AIS information supplements, but does not replace, marine radar, which continues to be the primary method of collision avoidance for water transport.

To exchange information, a maritime mobile service identity (MMSI), which is a series of nine digits which are sent in digital form over a radio frequency channel in order to uniquely identify ships, can be transmitted by AIS to ship earth stations, coast stations, coast earth stations, and other ships. The nine-digit MMSI format allows for use by telephone and telex subscribers connected to the general telecommunications network to call ships automatically. The international maritime organization's (IMO) international convention for the safety of life at sea (SOLAS) requires AIS to be fitted aboard international voyaging ships with gross tonnage (GT) of 300 or more tons, and all passenger ships regardless of size. It is estimated that more than 40,000 ships currently carry AIS equipment. In sum, AIS can be a very powerful tool for managing vessel information.

Notwithstanding the above, one of the shortcoming of AIS is that a participating vessel must voluntarily report information about itself. There is no way to verify that a vessel's position, course and speed are that same as what it is reporting. Satellite imagery is one method of determining such accurate information about a ship, but there it is very difficult to determine which ships are being processed. Accordingly, it is often desired to supplement satellite imagery information with AIS, and vice versa, in order to obtain a clearer picture of vessels in a given area of interest.

In general, fusion of AIS position information with vessels identified in imagery is currently a manual process where AIS tracks are manually overlaid over a manually exploited image. The overlay displayed does not combine or fuse information from the two sources. There is no mathematical fusion that occurs. The process is simply a data dump of information. An analyst examining the final product will have to use subjective judgment to determine which AIS reports most likely correspond to vessels identified in the image. Current efforts in the area of automatic fusion of imagery with other intelligence sources use only latitude and longitude to determine which position reports match to vessels in the scene. Initial attempts ignore feature information, such as length, width, heading, and ship type, which can be obtained from an automated ship detection software system.

In view of the above, one object of the present invention is to provide an automated image identification system and method that effectively fuses satellite imagery with vessel reporting databases such as AIS. Another object of the present invention is to provide a system and method for fusing overhead imagery with automatic vessel reporting systems that reduces the chance of attributing a vessel identified in an image to an AIS position report with false information. Yet another object of the present invention is to provide a system and method for fusing overhead imagery with automatic vessel reporting systems that quickly and effectively allows analysts to identify vessels that are reporting false or spoofed information. Still another object of the present invention is to provide an automated image identification system and method provide intelligence agencies and the fleet with a more detailed operational picture to be used in combination with existing vessel tracking technologies, by identifying vessels that have gone dark (vessels that have stopped emitting position reports). An object of the present invention is to provide an automated image identification system and method that fuses satellite imagery with AIS information in near real-time. Another object of the present invention is to provide an automated image identification system and method that fuses satellite imagery with AIS information at a high throughput to allow for processing of vessel information in high traffic areas. These and other advantages of the invention, as well as additional inventive features, will be apparent from the description of the invention provided herein.

SUMMARY OF THE INVENTION

A system for processing satellite imagery according to several embodiments can include a satellite for generating satellite images, a processor connected to the satellite for retrieving the satellite images, a remote database of vessel reported position data and a computer readable storage medium. The medium stores instructions that, when executed by the processor, cause the processor to perform a method for processing the satellite imagery by fusing information from the images with information from the remote database to automatically identify ships. The methods accomplished by the processor according to several embodiments can include the initial steps of defining an Area of Interest (AOI) and a Time of Interest (TOI) for a retrieved satellite image. At the TOI, there can be imaged vessels within the satellite image AOI, with each imaged vessel having imagery position data.

The systems and methods according to several embodiments can further include the steps of defining a predetermined time window around the TOI, and enlarging the AOI according to the predetermined time window using an assumed maximum speed for a vessel. Once the AOI is enlarged, the methods can include the steps of accessing the vessel position data from the remote database for all vessels that are purportedly within the enlarged AOI, or projected to be within the enlarged AOI at the TOI, and comparing that vessel position data to imagery position data, which has been formatted to facilitate the comparison. One exemplary remote database that could be used is the Automatic Identification System (AIS), and the comparison step can be accomplished using a Chi-Squared probability analysis.

In some embodiments, the vessel imagery data can be filtered during the formatting step to remove stationary man-made objects and land objects, and the imagery position data can be further updated to account for vessel wakes. In other embodiments, the AIS vessel position data that is reported by a single ship can be consolidated and only certain portions of that data that are within the time window or that bracket the TOI can be selected for further use by the methods. These steps can facilitate the computational complexity of the methods, particularly in enlarged AOI's that are high traffic vessel areas.

If the comparison step meets predetermined probability threshold criteria, the methods can further include the step of assigning a reported AIS identity to an imaged vessel. If it happens that there are imaged vessels that do not correlate to any AIS reporting data, or vice versa, the methods according to several embodiments can include the step of alerting the operator that this is the case.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The novel features of the present invention will be best understood from the accompanying drawings, taken in conjunction with the accompanying description, in which similarly-referenced characters refer to similarly referenced parts, and in which.

DETAILED DESCRIPTION OF THE EMBODIMENTS

In brief overview, the invention can consist of satellite systems and methods of use therefor that fuse information from the Automatic Identification System (AIS) position reports with information obtained from satellite imagery. This is accomplished to determine which vessel detected in a time coincidental satellite image (defined herein as imagery taken at approximately the same time as the collection of AIS reports) corresponds to a reported AIS vessel position and track. The invention is designed to handle large satellite image area footprints and long tracks of AIS position reports. The invention according to several embodiments can apply statistical reasoning to determine which AIS and imagery positions are most likely the same vessel.

The output of the fusion of satellite imagery and AIS can be displayed in tabular form in any one of a number of formats that are easily observed by the user. One such format can be a GoogleEarth™ display. The GoogleEarth™ output can display one placemark for each object in the scene. When an AIS report can be positively matched with a satellite imaged vessel, all the information from both sources can be displayed along with a column indicating how the information from each source differs. The embodiments herein disclose four different scenarios:

1. Object detected in imagery area with no positive AIS match;

2. AIS report/track in imagery area with no positive imagery detection match;

3. Positive AIS-imagery fusion match; and,

4. AIS report/track outside image area.

These embodiments are discussed more fully below.

Figure 1:
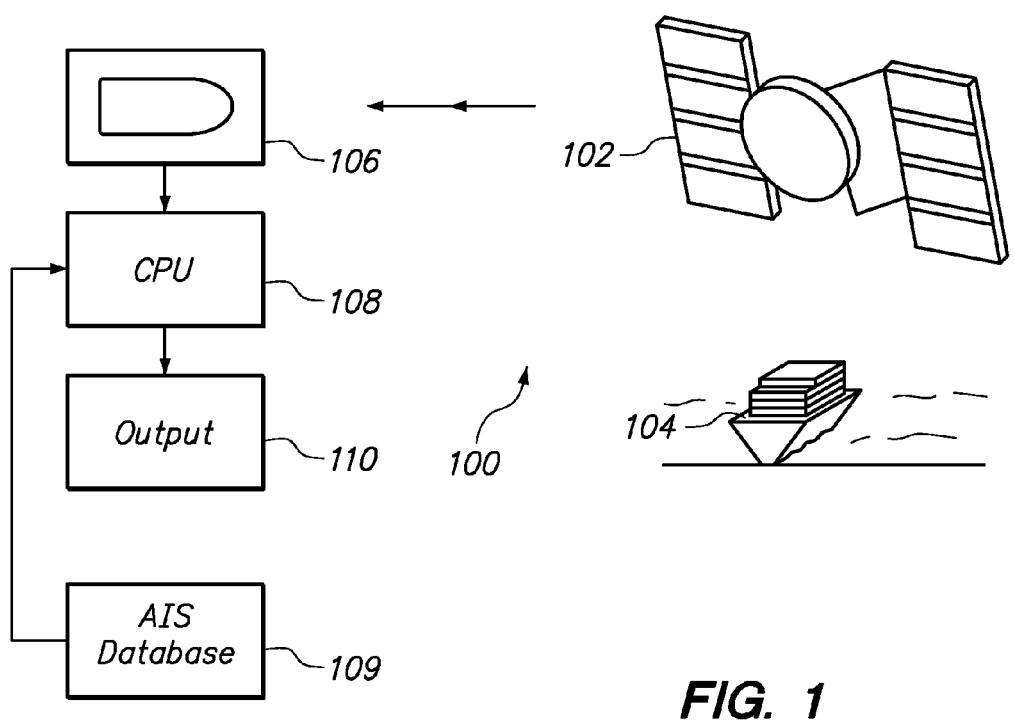
FIG. 1 is a diagram of a system for fusing overhead imagery with automatic vessel reporting systems in accordance with several embodiment of the invention.

Referring now to FIG. 1, a system for processing of satellite imagery of vessels is shown and generally designated by reference character 100. As shown, system 100 includes a satellite 102, which detects ships/vessels 104 using imagery methods that are known in the art. One such imagery method can include nadir panchromatic electro-optical imagery. One such system and methods for detection of ship providing such satellite imagery input into the present invention can be found in U.S. patent Ser. No. 12/197,421 by Buck et al. for an invention entitled "Ship Detection System and Method from Overhead Images", which is assigned to the same assignee as the present invention. The satellite 102 generates an image 106 of vessel 104. The system and methods according to several embodiments of the present invention can manipulate image 106 and information from the Automatic Identification System (AIS) database 109 using a processor 108 to yield a identification output 110, which is a probability that the vessel 104 in image 106 has been identified. The manner in which the system identifies the satellite imagery is described more fully below.

Figure 2:
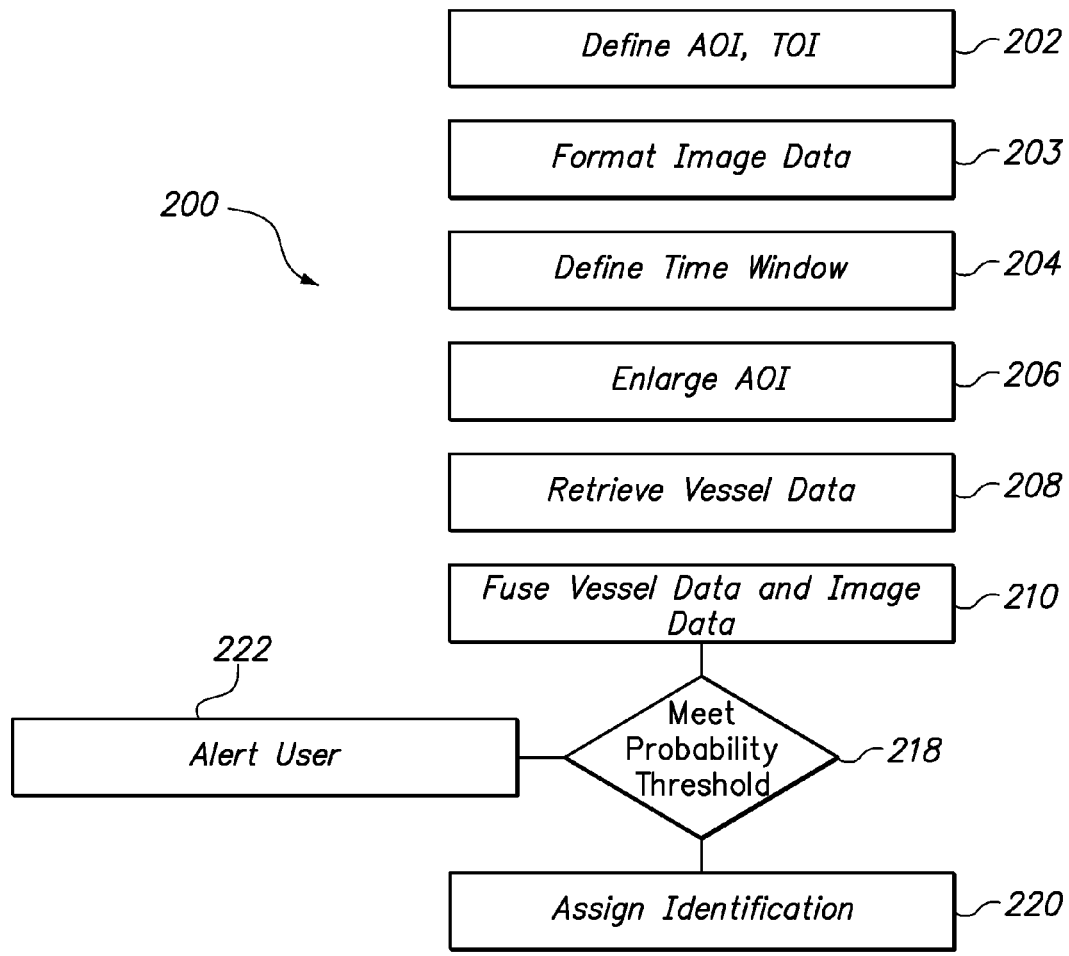
FIG. 2 is a block diagram of an algorithmic sequence of steps that can be taken to accomplish the methods according to several embodiments of the present invention.
Figure 3:
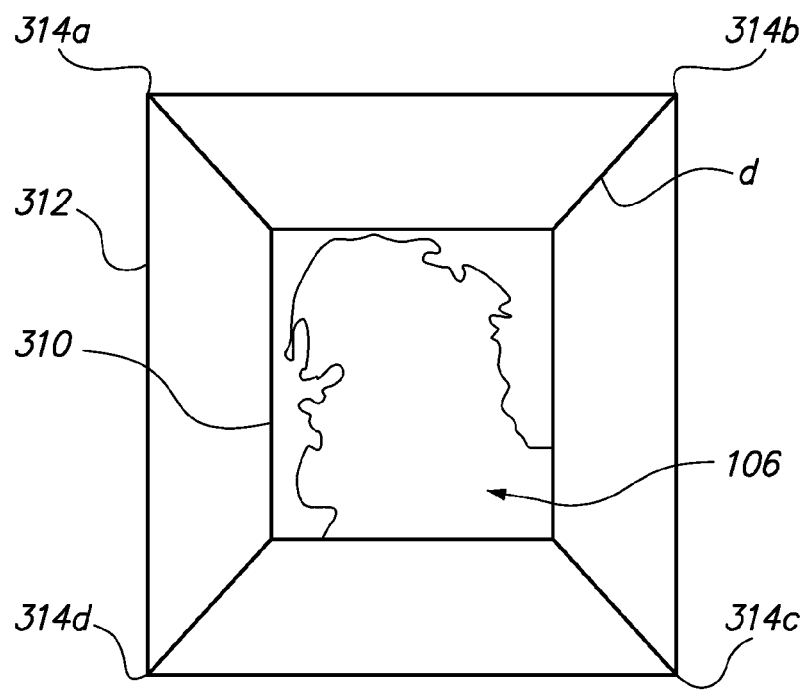
FIG. 3 is a lined drawing of a satellite image, which displays an Area of Interest (AOI) and an enlarged AOI that is used to accomplish the methods displayed in the block diagram of FIG. 2.

Referring now to FIGS. 1-3, a block diagram that describes the methods according to several embodiments of the invention is shown, and is generally designated by reference character 200. As shown, method 200 can include the step 202 of defining an Area of Interest (AOI) 310 (See FIG. 3) and a Time of Interest (TOI) for image 106. Before proceeding further, it should be appreciated that AIS is an international reporting system that requires vessels to repeatedly report certain information, including position, course and speed, at specified time intervals. Thus, before fusing AIS with satellite imagery, it is important to define a time window around the TOI when the information from the AIS database 109 is needed. One such time window could be twelve minutes, based on the AIS reporting requirement frame of 6 minutes for a vessel that is moored/anchored. A 12-minute window (6 minutes before and 6 minutes after the TOI) would be sufficient to ensure receipt of vessel AIS reports from all vessels in the image area, at least when AIS is used as the remote database 109, including vessels that are moored or anchored. However, other time windows could be chosen according to the database 109 chosen and the needs of the operator.

To account for this, and as indicated by steps 204 and 206 in FIG. 2, a time window around the TOI must be defined and the AOI must be enlarged using the defined time window and an assumed maximum speed for vessels. The goal of steps 204 and 206 is to ensure all AIS position information for any ship that may appear in the image area during the time window is retrieved. If the system only considered AIS at the TOI, or if the defined time window is too small, the position and characteristic information for some vessels in the area would be missed. It could be that there is a ship that last reported just outside AOI 310, but was heading into the image AOI 310. Or, a ship could have reported just inside the AOI 310, but be heading in a direction outside of the AOI 310.

If the system only considered AIS inside the image original AOI 310, it would not get the last reported position of the ship to be used in the scenarios above, and would not be able to project the ship location at image TOI inside the image AOI 310. As a result, it would not be able to accurately fuse the detect object in the imagery data with the corresponding AIS information. For the methods according to several embodiments, step 204 is accomplished to account for such scenarios. The last known position (outside the image area) can be used to project the vessel's expected position at image time to be fused with the detected object in the image.

The maximum speed that a vessel can report in AIS is 102.2 knots (or nautical miles per hour). While this speed is highly unlikely, the system 100 is designed around the possibility of a vessel could report this speed over ground. The conversion factor (1 nautical mile=1852 meters) is used for all calculations. Thus, the maximum speed that a vessel can report is 102.2 nautical miles per hour=189274.4 meters per hour. The maximum possible distance which can be traversed (or reportedly traversed) in the specified time window is determined using the basic distance function (d=rate×time):

Max Distance Traveled in Time Window (meters)=$d$=Maximum Time from Image Time (hours)×189274.4 (meters)

To expand on this, consider an example. Suppose there is a vessel that last reported 6 minutes (or the maximum time difference as determined by the time frame) before/after the image time and reports a speed over ground of 189274.4 meters. Therefore, the maximum distance this vessel could possibly have traveled in the time period is 6×189274.4=1135646.4 meters. This value is used as the maximum distance d traveled in the time window by any vessel in the AOI 310.

The new corner coordinates of an enlarged AOI 312 can be determined based on this maximum distance value d. As indicated in FIG. 3, enlarged AOI 312 has corner coordinates 314$a$-$d$ that are d meters from the original AOI 310 image corner coordinates. The original area is stretched out based on this calculated d, which maintaining the relative length to width ratio of the original AOI 310.

To determine the location (latitude$_2$, longitude$_2$) of corner coordinates 314$a$-$d$ that are at a distance d out on the c radial from an original point (latitude$_1$, longitude$_1$):

a. Convert Distance (meters), Latitude$_1$ and Longitude$_1$ and direction of coordinates 314$a$-$d$ to radians. Note that the Equations assume the west direction is positive, which is against conventional mathematics. To account for this multiply longitude values by (−1):

$$d\_radians = \frac{d}{1852}\left(\frac{\pi}{180}\right)$$

$$c\_radius = course\left(\frac{\pi}{180}\right)$$

$$latitude_1\_radians = latitude_1\left(\frac{\pi}{180}\right)$$

$$longitude_1\_radians = (-1)longitude_1\left(\frac{\pi}{180}\right)$$

b. Calculate Latitude$_2$ and Longitude$_2$:

$$latitude_2\_radians = sin^{-1}\left(\begin{array}{c} sin(latitude_1\_radians)cos(d\_radians) + \\ cos(latitude_1\_radians)sin(d\_radians)cos(c\_radians) \end{array}\right)$$

$$longitude_2\_radians =$$

$$mod\left(\begin{array}{c} longitude_1\_radians - \\ sin^{-1}\left(sin(c\_radians)\frac{sin(d\_radians)}{cos(latitude_1\_radians)}\right) + \pi, 2\pi \end{array}\right) - \pi$$

c. Convert Latitude$_2$ and Longitude$_2$ to Decimal Degrees:

$$latitude_2 = latitude_2\_radius\left(\frac{180}{\pi}\right)$$

$$longitude_2 = (-1)longitude_2\_radius\left(\frac{180}{\pi}\right)$$

The above process can be repeated to find all for each of coordinates 314$a$-$d$ to define enlarged AOI 312.

Before being used in the system and methods according to several embodiments, the satellite vessel imagery data can be formatted, as indicated by step 203 in FIG. 2. To do this, individual vessel information from enlarged AOI 312 of image 106 can be saved to a matrix in an Extensible Markup Language (XML) matrix that will be used in methods according to several embodiments described herein. This is performed using an XML parser that was written specifically to handle the output from a ship detection software system. The parsing function is written to extract the following information from the automated ship detection system output file, when available:

(1) Detect ID
(2) Ship Type Confidence
(3) Ship Type
(4) Error Ellipse—Semi Major Axis
(5) Error Ellipse—Semi Minor Axis
(6) Error Ellipse—Azimuth
(7) Heading 1 (1 of 2 because of 180 Degree Ambiguity)
(8) Heading 2 (2 of 2 because of 180 Degree Ambiguity)
(9) Heading Accuracy
(10) Algorithm Used to Determine Most Likely Heading
(11) Length
(12) Detect Confidence
(13) Width
(14) Detect Coordinate—CenGeoPoint (Longitude)
(15) Detect Coordinate—CenGeoPoint (Latitude)
(16) Image TOI Date
(17) Image TOI Time
(18) Enlarged AOI Image Corner Coordinate—Upper Left (Latitude)
(19) Enlarged AOI Image Corner Coordinate—Upper Left (Longitude)
(20) Enlarged AOI Image Corner Coordinate—Upper Right (Latitude)
(21) Enlarged AOI Image Corner Coordinate—Upper Right (Longitude)
(22) Enlarged AOI Image Corner Coordinate—Lower Right (Latitude)
(23) Enlarged AOI Image Corner Coordinate—Lower Right (Longitude)

(24) Enlarged AOI Image Corner Coordinate—Lower Left (Latitude)

(25) Enlarged AOI Image Corner Coordinate—Lower Left (Longitude)

The XML output file will contain the image TOI (elements 16-17) and the image enlarged AOI corner coordinates (elements 18-25) only once. The remaining information (elements 1-15) will be provided for each object detected in the image. The XML parsing function outputs the above information in three cell matrices, which can be easily referenced during the fusion process: (1) Image Detect Data (elements 1-15); (2) Image Date Time (16-17); and, (3) Image Corner Coordinates (18-25). Therefore, if there are 10 objects detected in the image the Image Detect Data matrix can be a 15×10 matrix containing information for each of these objects. The Image Date Time matrix can be a 2×1 matrix, and the Image Corner Coordinates matrix can be an 8×1 matrix. The information is divided into three separate matrices because they do not have the same number of columns. Combining all of the information into one matrix would be inefficient and would require numerous place holder values to be sorted through, which would further require more processing capability during processing. Stated differently, for a given enlarged AOI and TOI, there will most like be several (many) vessels with different 15×10 matrices, for a given Image Date Time matrix and Image Corner Coordinates matrix, which will remain constant for a time window.

Figure 4:
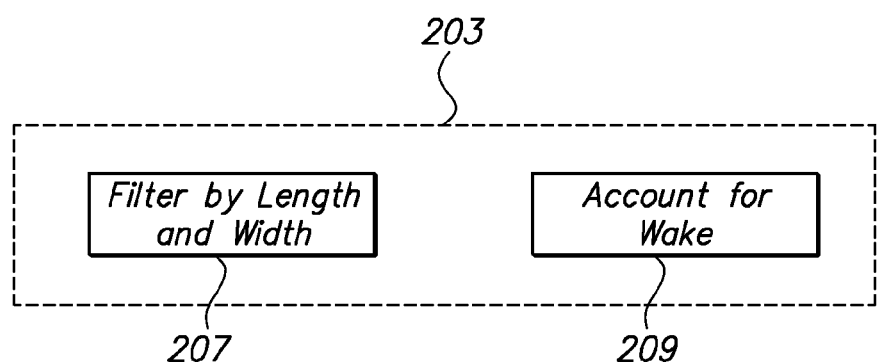
FIG. 4 is a block diagram which shows additional steps that can be taken in the format satellite imagery data step in FIG. 2.

The imagery position data can be further formatted to ensure that poorly conditioned objects are removed from consideration. Removing poorly conditioned objects mitigates issues that ship detection systems experience, which may impact the performance of the fusion algorithm. For example, a typical automated ship detection software system is designed to detect all anomalies on the water surface after the land has been eliminated by a land mask. However, the generic land mask does not perfectly eliminate all land, and large pieces of land may still be detected by the software. In addition, man-made objects on the water surface that are not ships cannot be masked out or uniquely identified, and will be detected as if they were ships. As a result, every object detected by the software system may not be a good candidate for inclusion in the fusion process. If included, these non-ship objects and exaggerated dimensions could interfere with the accuracy of the fusion algorithm. To remedy this, the objects passed to the fusion engine must be within a reasonable bound. Objects with a length greater than 650 meters and a length-to-width ratio of less than 1.25 are removed from consideration, as indicated by step 207 of the formatting step 203 in FIG. 4.

Additionally, satellite systems cannot be easily separate a detected vessel from its wake. As a result, the wake is often included in the image position data as part of the measurement of length and width of the vessel. The geo-position (latitude and longitude) of a detected object is calculated by the automated vessel detection software system as the center of the object. Therefore, the identified location of a vessel with a long wake would be highly inaccurate. To compensate for the inaccurate position (latitude and longitude) in the presence of a wake, the position of the detection is moved closer to the center of this vessel to more accurately reflect the true position of the vessel (minus the wake). Based on analysis of vessels with wakes, it was determined that a distance d=detection length/4 is a good estimate of how far the position should be moved along the major axis to more accurately reflect the position of the vessel when a wake is present.

Figure 5:
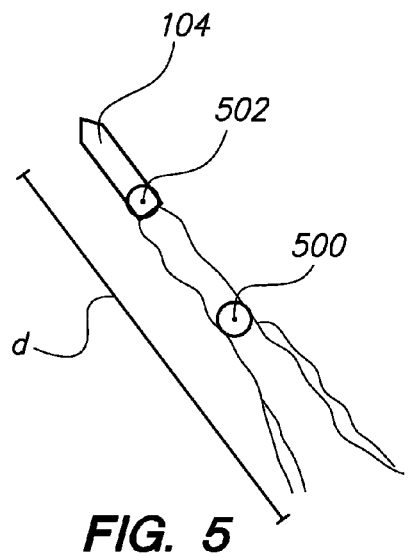
FIG. 5 is a lined drawing of a satellite image, which depicts how the steps from FIG. 4 can be used to update the position data of the imagery; and, FIG. 6 is a block diagram which shows additional steps that can be taken while accomplishing the fusion step in FIG. 2; and, FIGS. 7-10 are display templates of results obtained using the methods described in FIG. 2; and, FIG. 11 is a diagram which shows how processing capabilities can be conserved in the fusion steps by attempting to fuse only certain images with AIS position report data.

If a most confident heading is articulated by the vessel detection satellite/software and a wake is identified, the position of the detection is moved (using techniques described above) a distance d=detection length/4 in the direction of the most confident heading. If a most confident heading is not articulated or the wake is not identified, the position remains unchanged. The process of updating the position of vessels with wakes will allow for more confident fusion of AIS-imagery because the updated position will more accurately reflect the position of the vessel and will be closer to the AIS reported position. FIG. 5 illustrates how the original imaged vessels position 500 can be changed to updated position 502 using the procedures described above. The Image Detect Data matrix can be updated to reflect these excluded objects and updated positions.

Once the AOI is enlarged and the satellite image position data has been formatted as described above, and as indicated by step 208 in FIG. 2, the methods of several embodiments of the present invention can include the step of retrieving vessel data from the AIS database. All AIS position reports that meet the location and time criteria (i.e., within the enlarged AOI 312 during the time window) are extracted from the local AIS database. The AIS position reports can include the following information as reported by the ship:
1. MMSI
2. Navigation Status
3. Rate of Turn (ROT)
4. Speed Over Ground (SOG)
5. Position Accuracy
6. Longitude (decimal degrees)
7. Latitude (decimal degrees)
8. Course Over Ground (COG)
9. True Heading (degrees)
10. AIS Time Stamp (DD-MMM-YY HH:MM:SS:FFF AM/PM)
11. IMO
12. International Radio Call Sign (IRCS)
13. Vessel Name
14. Vessel Type
15. Length (m)
16. Width (m)
17. Estimated Time of Arrival
18. Draught
19. Destination The AIS position report data for the area and time period can be saved to a file. This file is read by the fusion function and the some of the AIS data is extracted from the file and saved to a matrix for use during the fusion step, as described below.

For the methods according to several embodiments a very large amount of AIS vessel reporting data must be fused with the imagery position data. While at anchor, a ship is only required to report its position once every 6 minutes, but while underway, a ship will report its position once every 2 to 10 seconds. Depending on the time window considered, the size of the enlarged AOI, and the number of vessels in the enlarged AOI, there could be an unmanageable number of AIS reports to be considered. Further, many of the AIS report are duplicative; each vessel can (and underway vessels almost certainly will) have numerous AIS reports within the enlarged AOI and time window, but only one report per vessel will be used in the fusion step (described below) according to several embodiments.

To give an idea of the exponential growth of the AIS vessel reporting data that could occur, consider a basic scenario. Suppose 10 ships report during a 12 minute time window, 6 minutes before and 6 minutes after the image TOI (recall that a minimum of 6 minutes before/after is required to ensure that AIS vessel position report data for anchored/moored vessels is captured). Suppose that each of the 10 ships is underway and is reporting once every 10 seconds. Therefore, each ship reports 6 times per minute and thus 72 times during the time period. This would result in 720 AIS reports during the time window.

To manage the AIS vessel position report data, and to reduce the number of calculations in the fusion process described below, the AIS reports can be pre-processed by consolidating AIS position report data retrieved in step 208. To do this, the data is filtered to determine the number of unique vessels reporting in the area of interest, and to determine the AIS vessel position report closest to the image at the TOI or two reports bookending the image TOI (one before and one after) for each of the unique vessels. This eliminates unneeded AIS vessel reporting data before it goes through the complicated fusion steps. It is unlikely that a ship will report at the exact same time as the image, so the report(s) closest to the image time must be identified and used to predict the location of the ship (i.e. project the AIS position reporting data at the image TOI).

The AIS projected position processing steps are conducted as follows:

a. Calculate time difference (in seconds) between the image TOI and AIS report time for all AIS position reports in the enlarged AOI (this will include multiple reports for some ships).

b. Determine the unique ships in the AOI—based on the reported MMSI.

c. For each unique ship (unique MMSI)—determine the AIS position reports associate with that ship (a subset of the AIS in the AOI).

d. For each unique ship (unique MMSI)—use the subset of AIS in c and determine the last AIS report before the image time and the first AIS report after the image time (or the report at the image time if they are exactly the same). To do so, utilize the calculated time differences from step a).

e. Determine the projected position at image TOI based on the reports identified in step d).

If there is a vessel position data report before the image TOI and a vessel position data report after the image TOI, these two known positions, the time difference between the two known positions can be interpolated to project project the AIS vessel position data at the image TOI. To determine the location (latitude, longitude) of a point on a line between two points given a time difference:

1) Calculate distance (m) between last before and first after using Haversine Distance Function, which is know in the prior art;

$$d = (1000) * 2r\sin^{-1}\left(\sqrt{\sin^2\left(\frac{lat_B - lat_A}{2}\right)\cos(lat_B)\cos(lat_A)\sin^2\left(\frac{lon_B - lon_A}{2}\right)}\right)$$

$r$ = Average Earth Radius = 6372.795 km

2) If distance between last before and first after is zero (0), then use last before as position at image time.
3) If distance between last before and first after is greater than zero, then determine the location at image time.
4) Calculate time (secs) between last before and first after.
5) Calculate speed over ground (meters/sec) the vessel was travelling between the two points.

$$\text{speed} = \frac{d}{\text{time between}}$$

6) Calculate distance(m) travelled in time (secs) between last before and image time.

d_travelled=speed*time between last before and image time

7) Convert distances (d and d_travelled) to radians.

$$d = \frac{d * r}{1000} \quad \text{d\_travelled} = \frac{\text{d\_travelled} * r}{1000}$$

8) Calculate fraction of distance d the vessel traveled in time difference.

$$\text{fracDist} = \frac{\text{d\_travelled}}{d}$$

9) Determine intermediate point (latitude, longitude) on course between last before and first after, fracDist from last before.

$$lat_B = lat_B\left(\frac{\pi}{180}\right) \quad lon_B = (-1)lon_B\left(\frac{\pi}{180}\right)$$

$$lat_A = lat_A\left(\frac{\pi}{180}\right) \quad lon_A = (-1)lon_A\left(\frac{\pi}{180}\right)$$

$$A = \frac{\sin(d(1 - \text{fracDist}))}{\sin(d)}, \quad B = \frac{\sin(\text{fracDist} * d)}{\sin(d)}$$

$$x = A\cos(lat_B)\cos(lon_B) + B\cos(lat_A)\cos(lon_A)$$

$$y = A\cos(lat_B)\sin(lon_1) + B\cos(lat_A)\sin(lon_A)$$

$$z = A\sin(lat_B) + B\sin(lat_A)$$

$$lat_I = a\tan2(z, \sqrt{x^2 + y^2})\left(\frac{180}{\pi}\right), \quad lon_I = a\tan2(y, x)\left(\frac{-180}{\pi}\right)$$

The projected position (latitude, longitude) of the vessel at image TOI is latitude$_I$ and longitude$_I$.

If there is a vessel position data report BEFORE the image TOI and NO report AFTER the image TOI, then the last reported AIS position, the time difference between the AIS position and the TOI, the image TOI, and the reported SOG, COG can be used to project the location of the vessel at the image TOI (i.e. the estimated location from the last reported position on the course reported). Note: If the vessel last reported a navigation status that indicated it was not moving, then the position is not updated and the last reported position is used.

If there is NO report BEFORE the image time and there is a report AFTER the image time, then the position after the image time, the time difference, the image time, speed over ground, and reverse course of ground reported are used to backtrack the ship to the estimated location at image time. Note: If the vessel reported a navigation status that indicated it was not moving, then the position is not backtracked and the first reported position after the image time is used.

To determine the location (latitude, longitude) of a point on a known distance out on a course from a known point for an underway vessel, COG, SOG can be extrapolated to the TOI, as follows:

1) Calculate the time difference between the image time and the position report being used for projection (secs). If time difference is zero (0), then do not project position and use position at report time.
2) Calculate distance travelled (meters). Use the formula: distance (m)=speed(m/s)*time(secs);
3) Determine Course Over Ground for Calculation of Position;

4) If Image TOI is after AIS vessel reporting time, then move projected AIS vessel reported position data in the direction of reported COG;

5) If Image TOI is Time is before AIS vessel reporting time, the move projected AIS vessel reported position data in the negative (opposite) direction of the AIS reported COG, or in the direction of COG+180 degrees; and, 6) Calculate projected position based on distance travelled (d).

$$lat_2 = \sin^{-1}(\sin(lat_1)\cos(d) + \cos(lat_1)\sin(d)\cos(c))\left(\frac{180}{\pi}\right)$$

$$lon_2 = \left(\frac{-180}{\pi}\right)\mod\left(lon_1 - \sin^{-1}\left(\sin(c)\frac{\sin(d)}{\cos(lat_1)}\right) + \pi, 2\pi\right) - \pi$$

As a final pre-processing step, the AIS position reports must be organized for use in the fusion step. At this point, a unique vessel position report has been identified for all AIS-reporting ships in the enlarged AOI 312 and position report data for projected positions at the TOI has been generated. These unique reports will be used in the fusion process for comparison with objects detected in the scene. There are numerous AIS position reports for these ships in the image area that are not being used in the fusion step for the methods disclosed herein, but these reports are still useful. These AIS reports will be referenced later to construct vessel tracks for all ships identified in the image. There are also AIS reports in the enlarged AOI for ships that never entered the image area. These AIS reports will not be considered in the fusion process, but they can still be displayed according to the needs of the operator.

Referring again to FIG. 2, the methods according to several embodiments of the invention can include the step of fusing the AIS vessel reported data with the satellite image position data, as indicted by step 210. To do so, the methods take information from the AIS reports (position, heading, length, and width) and fuse it to satellite image position data for each detected object in the image area. The fusion algorithm performs a statistical Chi-Squared test to identify which AIS reports and imagery detects have the same characteristics with enough statistical significance to determine with some degree of confidence that they represent the same ship.

It should be appreciated that the fusion step is designed to allow for fusion of more than one AIS report to an imaged vessel with a lower confidence. This is because of limitations in satellite imagery that are know in the prior art. Automated vessel detection software is not able to separate vessels that are attached or docked together and is not able to separate vessels from land if they are at a dock. Vessels docked near land will be masked by the landmask function of the satellite imaging software (and not be detected), or they can be detected with land included in the detected object. These objects may be correctly fused with AIS in the area, but with lower confidence due to the inaccurate length and width that will be provided by the detection software. Vessels that are attached will be detected as one object.

Although other probability analyses could be used, the fusion step for the methods according to several embodiments of the present invention is completed using Chi-Squared test statistics and hypothesis testing. The hypothesis used is a statistical null hypothesis that the AIS vessel position report data and the image position data represent the same ship. Specifically, the algorithm conducts a test of significance to determine if an imagery position data for an image detect is or is not significantly different from the vessel position data reported in an AIS report in question. A hypothesis test is conducted to fuse each AIS report to each imagery detect within an acceptable radius (The radius selection is detailed in the next section). For each AIS position report and imagery detect, a feature vector is constructed as indicated by step 212 in FIG. 6:

$$AIS = A = \begin{bmatrix} lat_A \\ lon_A \\ length_A \\ width_A \\ heading_A \end{bmatrix} \quad IMINT = I = \begin{bmatrix} lat_I \\ lon_I \\ length_I \\ width_I \\ heading_I \end{bmatrix}$$

These feature vectors will be used during hypothesis testing. The feature data for both AIS and imagery is assumed to be accurate, independent, and is modeled by a normal distribution, with mean ($\mu$ and $\gamma$) and covariance (Q and R) matrices respectively:

$$AIS = A \sim N_5(\mu \epsilon \Re^5, Q_{5 \times 5}); \text{ and, } IMINT = I \sim N_5(\gamma \epsilon \Re^5, R_{5 \times 5}).$$

The elements of the feature vectors are independent and uncorrelated. Therefore, the methods according to several embodiments can include the step of establishing the covariance matrices for AIS data and satellite image data, Q and R respectively (as indicated by step 214 in FIG. 6), which reflect the error in the information in feature vectors A and I, and which are diagonal matrices whose non-diagonal elements are zero.

$$Q = \begin{bmatrix} \sigma^2_{lat_A} & 0 & 0 & 0 & 0 \\ 0 & \sigma^2_{lon_A} & 0 & 0 & 0 \\ 0 & 0 & \sigma^2_{len_A} & 0 & 0 \\ 0 & 0 & 0 & \sigma^2_{wid_A} & 0 \\ 0 & 0 & 0 & 0 & \sigma^2_{head_A} \end{bmatrix}; \text{ and,}$$

$$R = \begin{bmatrix} \sigma^2_{lat_I} & 0 & 0 & 0 & 0 \\ 0 & \sigma^2_{lon_I} & 0 & 0 & 0 \\ 0 & 0 & \sigma^2_{len_I} & 0 & 0 \\ 0 & 0 & 0 & \sigma^2_{wid_I} & 0 \\ 0 & 0 & 0 & 0 & \sigma^2_{head_I} \end{bmatrix}.$$

The algorithm uses default covariance matrices to incorporate known AIS and imagery positional and dimensional errors, to ensure a more reliable fusion product. Based on prior knowledge of the variance and reliability of latitude, longitude, length, width, and heading in AIS position reports, and prior knowledge of uncertainties in the satellite imagery vessel position data, the covariance matrices Q and R can be specifically defined for all calculations according to several embodiments. The positional error associated with the imagery detect information and the AIS reports is reflected in the estimated position error and the length and width error of the updated Q and R matrices below (position error is converted from meters to degrees in Q and R):

$$Q = \begin{bmatrix} \text{position error} & 0 & 0 & 0 & 0 \\ 0 & \text{position error} & 0 & 0 & 0 \\ 0 & 0 & 10 & 0 & 0 \\ 0 & 0 & 0 & 5 & 0 \\ 0 & 0 & 0 & 0 & 18 \end{bmatrix}; \text{ and,}$$

$$R = \begin{bmatrix} \text{position error} & 0 & 0 & 0 & 0 \\ 0 & \text{position error} & 0 & 0 & 0 \\ 0 & 0 & 50 & 0 & 0 \\ 0 & 0 & 0 & 30 & 0 \\ 0 & 0 & 0 & 0 & 18 \end{bmatrix}.$$

For each AIS position report and imagery detect comparison pair, a hypothesis feature vector A–I is constructed to test the null hypothesis that the two objects are from the same population (i.e. are the same). Under the null hypothesis ($H_0$):

$$H_0: \mu = \gamma \rightarrow H_0: \mu - \gamma = 0$$

A Chi-Squared statistical distribution can be introduced using this null hypothesis $H_0$. To do this, a new feature vector, A–I, is constructed for each AIS-imagery comparison pair to test the hypothesis that A–I=0, i.e. that $\mu - \gamma = 0$:

$$AIS - IMINT = A - I = \begin{bmatrix} lat_A - lat_I \\ lon_A - lon_I \\ length_A - length_I \\ width_A - width_I \\ heading_A - heading_I \end{bmatrix}$$

As known in the prior art on Chi-Squared statistics, a Chi-Squared random variable with d degrees of freedom is made of a sum of d independent normal random variables squared. For example, for a multivariate normal d-vector if $y \sim N(0, I)$, then $y'y \sim \chi^2(df=d)$.

It is also known in the prior art that if $x \sim N(\mu, Q)$ is a d×1 random vector and A is an m x d matrix and c is an m×1 constant vector, then $y = Ax + c \sim N(A\mu + c, AQA^T)$, where y an m dimensional normal vector and where $A^T$ is the transpose of A.

Figure 6:
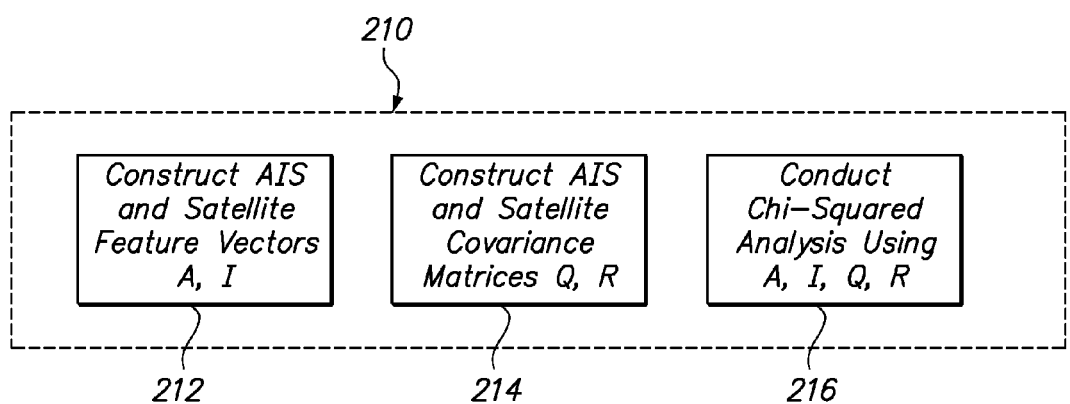
Figure 7:
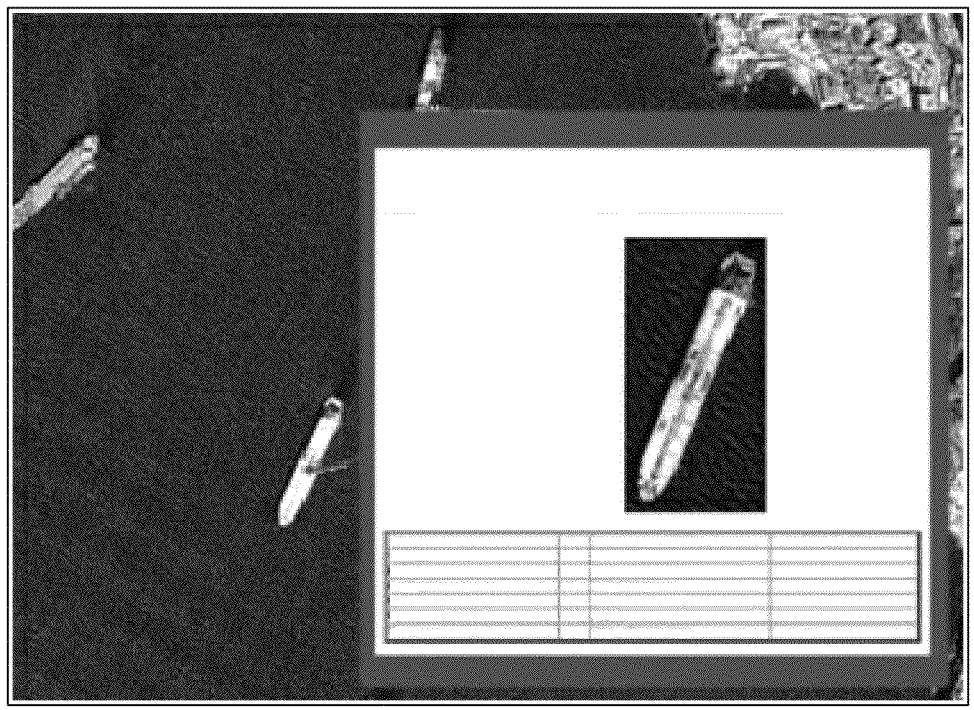
Figure 8:
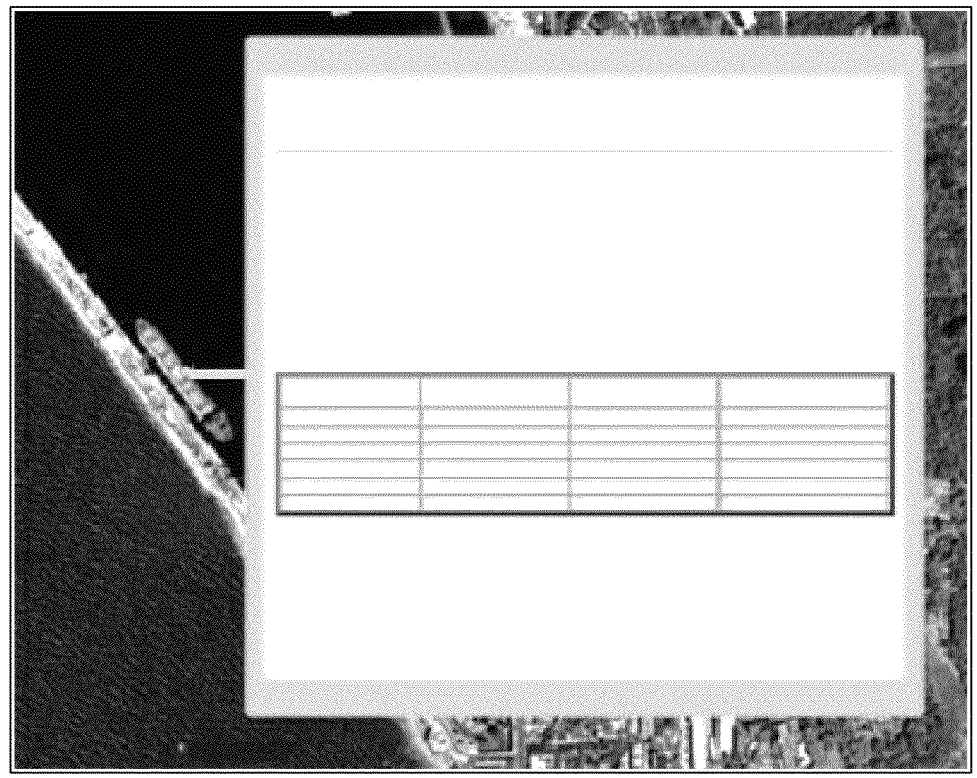
Figure 9:
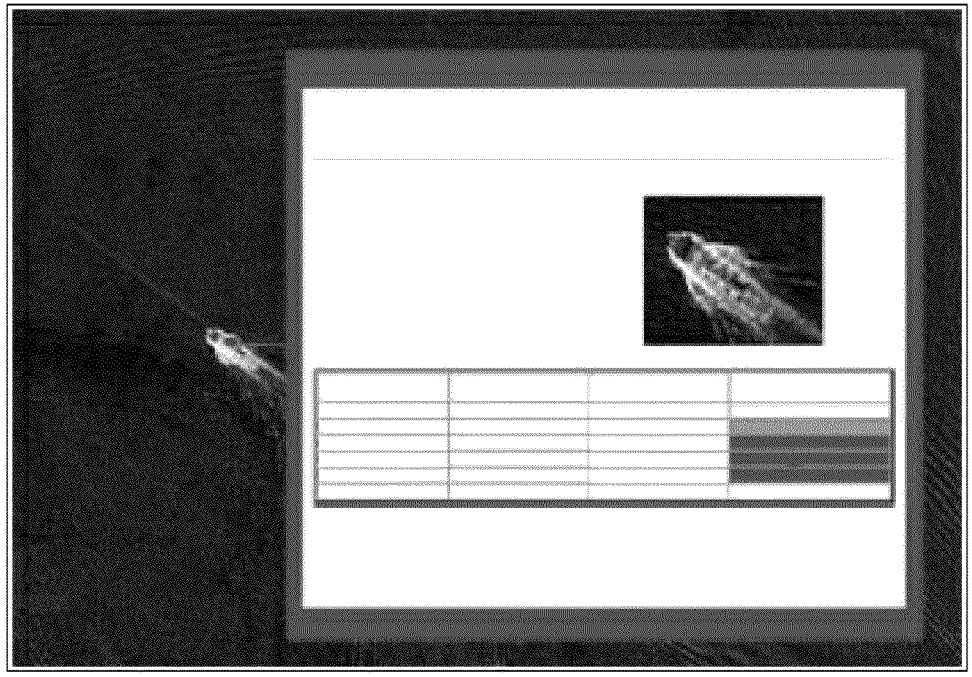
Figure 10:
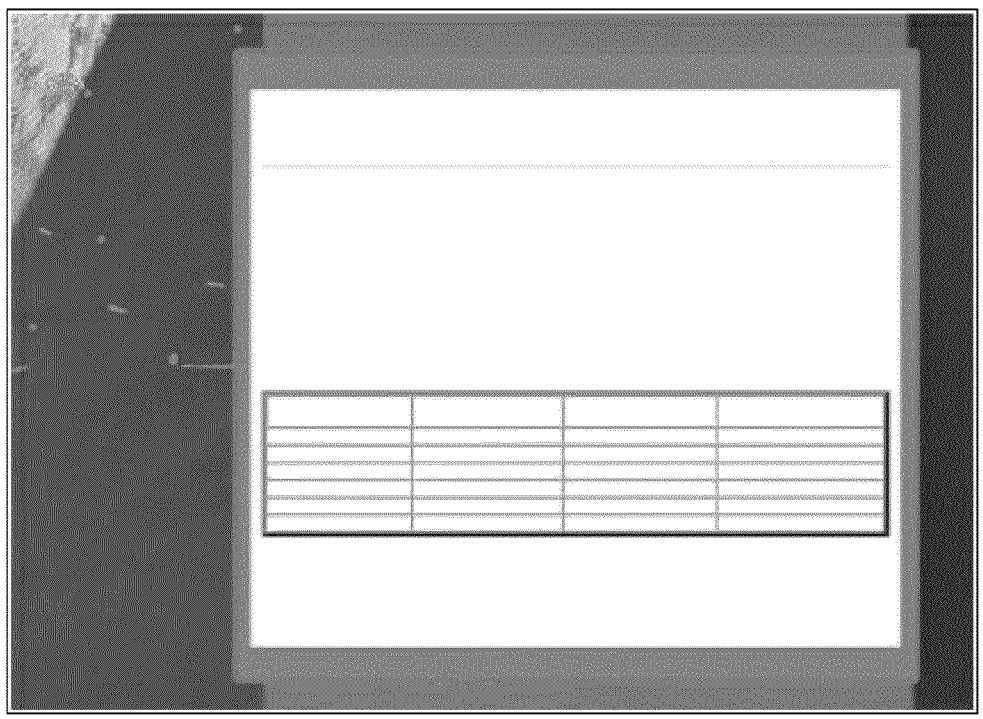

As applied to the methods of the present invention, and as indicated by step 216 in FIG. 6, a Chi-Squared analysis can be performed using A, I, Q and R according to several embodiments, if covariance matrix Q is positive definite (symmetric), then there exists a matrix $A = Q^{-1/2}$ such that $AQA = I$. This means that if $x \sim (\mu, Q)$ and $A = Q^{-1/2}$, then $y = A(x-u) \sim N(0, I)$. Using the above, the following can be deduced for statistical testing using a Chi-squared analysis of the null hypothesis ($H_0: \mu - \gamma = 0$):

$$A - I \sim N(\mu - \gamma, Q + R) \rightarrow A - I \sim N(0, Q + R)$$

Therefore, it can be seen that $y = (Q+R)^{-1/2}(A-I) \sim N(0,I)$, and $y'y = (A-I)^T(Q+R)^{-1}(A-I) \sim \chi^2(df=d)$.
Note that $(A-I)^T$ is a 1×5 matrix, (A–I) is a 5×1 matrix, and $(Q+R)^{-1}$ is a 5×5 matrix. Therefore, $(A-I)^T(Q+R)^{-1}(A-I)$ is a scalar value.

Because A, I and (A–I) are 1×5 matrices (vectors), there are at most 5 degrees of freedom (d) are at most 5 (five features used for comparison). The final chi-squared statistic is used for the hypothesis testing throughout the fusion process. For each projected AIS vessel position data report and imagery position data being fused, this statistic is constructed and used to accept or reject the null hypothesis. This process is detailed more fully below.

For each projected AIS report, steps 212-218 are accomplished to attempt to fuse for each projected AIS report with processed image position data from a satellite image at the TOI. But to do this, for each AIS report and imagery detect fusion attempt, a Chi-Squared statistic must be constructed using the feature vectors A and I and covariance matrices Q and R defined above. If may be desirable to further minimize the computational complexity of the issue by limiting fusion attempts to projected AIS reports that are within an acceptable radius of satellite image position data.

To determine an acceptable radius, the fusion algorithm cycles through each AIS position report and complete the following steps:

a. Declare AIS position report feature vector A;
b. Determine AIS position error in meters (AIS position error is depicted by circle 1104 in FIG. 11);
within the AIS position report loop, for each image position data detected;
c. Declare imagery detect feature vector I (above). Leave Heading blank until step g (below) is complete;
d. Calculate imagery Error=maximum (imagery Error is represented by circle 1102 in FIG. 11)
e. Calculate Maximum Potential Position Error using AIS position error 1104 and imagery Error 1102.
f. Calculate Distance (meters) between AIS report and imagery detect.
g. Resolve heading ambiguity, if possible.

Figure 11:
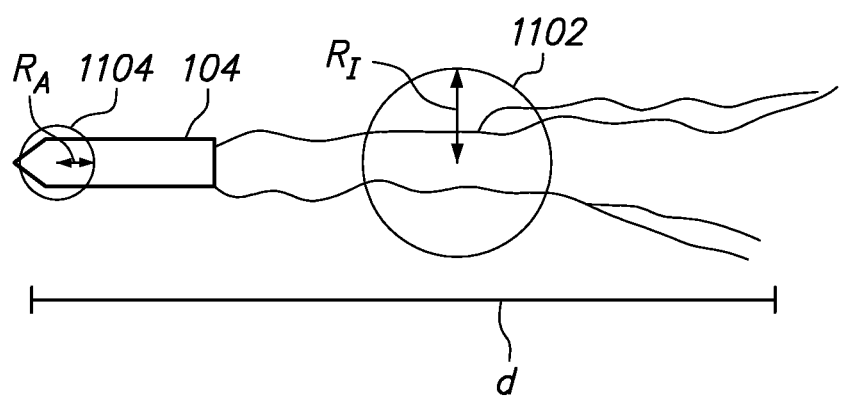

As stated above, the Maximum Potential Error value can be used to determine an acceptable search radius which can further be used as an additional threshold before any fusing of data occurs. This dynamic value changes based on the AIS position report and the imagery detect information. It is calculated based on how far away a projected AIS report and imagery position data could be, if both sets of data pertained to the same vessel and the information transmitted by AIS and determined by ship detection imagery were at the limits of their respective known errors. It also takes into account the presence of a large wake. The Maximum Position Error for the vessel is less than or equal to AIS Error+imagery Error+imagery Detect Length/2 ($R_A + R_I + d/2$). FIG. 11 illustrates the $R_A$, $R_I$ and d variables.

The calculated Maximum Position Error is used to determine an acceptable radius around the AIS position report (2×Maximum Position Error) to search for imagery detected positions to match to. In other words, instead of comparing each AIS report to every image detected in the image area, each AIS report will only be fused to imagery detects within this maximum position error radius. While this requires an initial check between each AIS report and imagery detect, this initial data gating will eliminate a lot of unnecessary processing by removing most imagery detects from consideration before further processing is conducted.

If the distance the projected AIS vessel position report and the image position data is larger than the Acceptable Search Radius=2×Maximum Position Error, then the AIS vessel projected reported position data is not compared to the image position data for that image, and the methods move on to the next imagery detect. However, if the distance is less than or equal to the acceptable search radius, then the heading ambiguity is resolve if possible, as cited in move on to step (g) above.

There are often two possible heading values for each detected vessel, due to a 180 degree ambiguity that cannot always be eliminated. Before the fusion step can occur, it must be determined which of the two headings is closest to the AIS reported heading and then compute the difference (on a 360 degree scale) between the AIS heading and the chosen imagery heading. To do this, the difference between the AIS heading and both imagery headings is first determined:

if $|heading_A-heading1_I| \leq 180 \rightarrow headingDiff1=|heading_A-heading1_I|$ else $headingDiff1=360-|heading_A-heading1_I|$ if $|heading_A-heading2_I| \leq 180 \rightarrow headingDiff2=|heading_A-heading2_I|$ else $headingDiff2=360-|heading_A-heading2_I|$ Second, determine which imagery heading is closest to the AIS heading:

if min(headingDiff1, headingDiff2)=headingDiff1→$heading_I$=heading1$_I$ else $heading_I$=heading2$_I$ The imagery feature vector I is then updated with the closest heading.

As cited above, for each project AIS report, the Chi-Squared test statistic for each AIS report and imagery detect comparison pair that is within the acceptable radius, as defined by the Maximum Potential Position Error, is calculated. The process of statistical testing is completed using the feature vectors A and I, and covariance matrices Q and R, as defined above. Based on the expected variability in the feature data and the occurrence of missing information, the fusion algorithm determines how significantly an AIS position report and imagery vessel detect fuse based on various combinations of the features in the feature vectors. The algorithm attempts to fuse an AIS report and imagery detect based on all features. If the comparison does not pass the Chi-squared test using all features, then fusion is attempted using fewer features.

To do this, the algorithm calculates a set of chi-squared test statistics for each AIS position report and imagery detect pair. The test statistics computed reflect the following feature combinations:

(1) Fusion Based on 4 Features—Position (Latitude/Longitude), Heading, Length, and Width
(2) Fusion Based on 3 Features
 a) Position (Latitude/Longitude), Length, and Heading
 b) Position (Latitude/Longitude), Length, and Width
 c) Position (Latitude/Longitude), Width, and Heading
(3) Fusion Based on 2 Features
 a) Position (Latitude/Longitude)—and Heading
 b) Position (Latitude/Longitude), and Length
 c) Position (Latitude/Longitude), and Width
(4) Fusion Based on 1 Feature
 a) Position (Latitude/Longitude)

The latitude and longitude are always available as a pair. As such, they are treated as one feature.

The covariance matrices Q and R and feature vectors A and I are modified to contain only the features in feature vectors A and I that have a values, and corresponding covariance values in matrices Q and R that are in consideration for the calculation. Furthermore, to account for the variability present in certain features and to emphasize certain features that must be as close as possible for confident fusion, the covariance matrices Q and R are weighted. The weighting corresponds to how accurate or close together each feature must be for confident fusion. For example, it is more important for an AIS position report and imagery detect position data to be close together (have significantly close latitude and longitude values) than it is for these two sets of data to have a significantly close heading value when attempting to fuse the two sets of data together. When using fewer than five features for fusion, the methods according to several embodiments require that the features that are being used be closer in value to each other (i.e. it allows less variability). Based on analysis of performance, acceptable default weights were identified. When two or more features are in consideration, corresponding weight values are taken from $$w = \begin{bmatrix} w_{lat} \\ w_{lon} \\ w_{len} \\ w_{wid} \\ w_{head} \end{bmatrix} = \begin{bmatrix} 2 & 0 & 0 & 0 & 0 \\ 0 & 2 & 0 & 0 & 0 \\ 0 & 0 & 4 & 0 & 0 \\ 0 & 0 & 0 & 5 & 0 \\ 0 & 0 & 0 & 0 & 3 \end{bmatrix}$$

When only position is in consideration, the following vector of weights is used:

$$w = \begin{bmatrix} w_{lat} \\ w_{lon} \end{bmatrix} = \begin{bmatrix} 1 & 0 \\ 0 & 1 \end{bmatrix}$$

The test statistic for each AIS report and imagery detect pair is calculated using the following equation with degrees of freedom (df) equal to the number of features.

$$(A-I)^T((w*Q)+(w*R))^{-1}(A-I) \sim \text{ChiSquared}_{df}$$

At this point, the fusion algorithm has resulted in a set of Chi-Squared test statistics for all AIS position report and imagery detect combinations. The algorithm must now determine the best imagery match (if any) for each AIS projected position report in the enlarged AOI.

First, probability significance thresholds can be set for each of the combinations of features and it can be determined whether the Chi-Squared analysis meets the probability threshold, as shown by step 218 in FIG. 2. These threshold values are drawn from the chi-squared test statistic table commonly used for all statistical testing (See Table 1 below). The algorithm is looking to accept the null hypothesis and determine which AIS position report and imagery detect are of the same population. Therefore, the methods are searching for a significance level (or alpha value) of 0.9 or higher. In other words, the $\beta=1-\alpha$ value must be 0.1 or smaller to confidently accept the null hypothesis.

TABLE 1

| Chi-Squared Statistics | | |
| --- | --- | --- |
| Number of Features | Confidence Level | Significance Threshold |
| 4 | 90% | 1.61 |
| 3 | 90% | 1.06 |
| 2 | 90% | 0.584 |
| 1 | 97.5% | 0.0506 |

The hypothesis test must pass at the specified probability confidence level to be considered significant and a confident match (See Table 1). The Chi-Squared test statistic computed using the methods described above must be less than or equal to the significance threshold for the corresponding number of features compared.

For each AIS position report, the algorithm sorts the test statistics by number of features in ascending order resulting in a sorted group of four, three, two, and one feature statistics. Only the minimum test statistic and the corresponding imagery detect in each feature group is considered for fusion. If the articulated probability confidence level is reached, the methods according to several embodiments fuse the AIS report and the image data to assign an identity to a vessel, as indicated by step 220 in FIG. 2.

The methods according to several embodiments look to fuse two objects based on the most features possible. In other words, if a confident fusion can be successfully accomplished based on four features, this is attempted before a fusion based on only three features. To determine the imagery detect match and the number of features to confidently match on, the fusion engine cycles through the remaining test statistics to find the highest confidence match, if one exists. If the minimum four features meet the probability threshold for four features, the algorithm fuses the AIS position report to the corresponding imagery detect based on four features. If the minimum four feature statistic does not meet the threshold, the fusion step 210 then examines the minimum three feature test statistic. If the minimum three feature statistic does not meet the probability threshold, the algorithm fuses the AIS position report to the corresponding imagery detect based on two features. This continues through the remaining two Chi-Squared statistics until a confident match is reached or it is determined that there is no confident match.

While fusion of a projected AIS vessel position data report and a image position based on fewer features may not be optimal, it eliminates the possibility of discouraging fusion when only one or two of the features are reported or measured incorrectly. In any case, the positive AIS-imagery matches can be recorded in a matrix to be referenced, which can be sent to a display output. One such exemplary out is the GoogleEarth™ KML output, although other display formats could be used. If no confident match is identified, then the AIS position report is recorded as not having an imagery match.

Once all of the AIS reports have been processed and matches have been identified, it is necessary to determine which AIS reports were not matched to an imagery detect and which imagery detects were not matched to AIS position reports in the image area. For each object that was not matched, the tool determines the closest detect or position report to its last known location and provides this information in the output. In these cases, the methods can also include the step of alerting the user that this is the case, as indicated by block 222 in FIG. 2.

As explained above, satellite 102 may be unable to separate vessels 104 from land. The corresponding imagery detect that should match to the AIS position report will include land and the measurements of length, width, and heading will be off. As a result, the imaged position data detected and AIS vessel reported position data report will most likely not match confidently. Also, there could be many AIS position reports in the image area, especially in port areas, that do not have a confident imagery match. To prevent losing information that is available, the output can further display all AIS reports in the image area, notwithstanding whether or not a fusion occurred.

By international convention, AIS reporting is require by vessels over 300 Gross Tons (GT), passenger ships certified to carry more than 150 passengers, towing vessels of 26 feet or more in length, and self-propelled vessels of 65 feet or more. It is important to identify vessels that are not adhering to carriage requirements as these may be vessels of interest or vessels that partaking in illegal activities. To prevent losing valuable operational information, the imagery detects over 300 GT (as estimated by the satellite image) that were not matched to AIS position reports can also be displayed in the GoogleEarth™ KML output. These detects can actually be the most important part of the fusion process as they will indicate vessels that are not emitting AIS as required. Step 222 can identify these instances The processing results, i.e. AIS reports without an image position data match, imagery position data without AIS projected report matches, AIS-imagery fused data, and AIS tracks can be sent to a GoogleEarth KML writer. The information as follows:

1) Red—Object detected in image with no positive AIS match.
2) Yellow—AIS report closest to image TOI in image AOI with no positive imagery detection match.
3) Green—Positive AIS-imagery fusion match.
  a) Four Feature Fusion
  b) Three Feature Fusion
  c) Two Feature Fusion
  d) One Feature Fusion
4) Blue—AIS report closest to image TOI outside image AOI.

The output can be opened in GoogleEarth™ or a similar type of display to evaluate the results and explore the processed information. The output is organized into expandable folders according to the color scheme described above and shown in FIGS. 7-10. Each output position can be double-clicked to display the detailed information (FIGS. 7-10). It should be appreciated, however, that other formats can be used instead of collar, such as cross-hatching the display in different formats, etc.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for identifying a vessel in a satellite image, said vessel having imagery position data in said image, said method comprising the steps of:
   A) defining an Area of Interest (AOI) and a Time of Interest (TOI) for said satellite image;
   B) defining a predetermined time window around said TOI;
   C) enlarging said AOI according to said predetermined time window and an assumed maximum speed for said vessel;
   D) retrieving vessel position data from a database for all vessels within said enlarged AOI;
   E) comparing said vessel position data from said step D) to said imagery position data from said step A); and,
   F) assigning an identity to said imaged vessel when said step E) meets a predetermined probability threshold.

2. The method of claim 1 wherein said step E) further comprises the step of:
   G1) filtering said satellite image from said step A) to remove said imaged vessels that are actually man-made objects and land masses, said step G1) occurring before said step E).

3. The method of claim 1 wherein said step E) further comprises the step of:
   G2) updating said imagery position data to account for vessel wakes, said step G2) occurring before said step E).

4. The method of claim 1 wherein said step F) is accomplished using a Chi-Squared probability analysis.

5. The method of claim 1 wherein said step D) further comprises the step of: consolidating said vessel position data that pertains to the same unique vessel.

6. The method of claim 5, wherein said step D) is accomplished by retrieving at least one position data point within said time window prior to said TOI and one position data point after said TOI.

7. The method of claim 6, wherein said step D) is accomplished by retrieving at least one position data point prior to said TOI and one position data point after said TOI.

8. The method of claim 1 wherein said database used in said step D) is the Automatic Identification System (AIS).

9. The method of claim 8 further comprising the step of:
   H) alerting an operator if at least one said vessel does not have an assigned identity resulting from said step F).

10. The method of claim 8 further comprising the step of:
    I) alerting an operator if said vessel position data is not assigned to one said vessel after completion of said step F).

11. A system for processing satellite imagery, comprising:
    a satellite for generating satellite images
    a processor connected to said satellite;
    a data remote from said processor; and,
    a computer readable storage medium installed on said processor, said medium storing instructions that, when executed by said processor, cause said processor to perform a method for processing said overhead images from said satellite to automatically identify ships, said method comprising the steps of:
    A) defining an Area of Interest (AOI) and a Time of Interest (TOI) for said satellite image, said satellite image having at least one imaged vessel, each said vessel having imagery position data;
    B) defining a predetermined time window around said TOI;
    C) enlarging said AOI according to said predetermined time window and an assumed maximum speed for said vessel;
    D) retrieving vessel position data from a database for all vessels within said enlarged AOI;
    E) fusing said vessel position data from said step C) to imagery position data from said step A); and,
    F) assigning an identity to said vessel when said step E) meets a predetermined probability threshold.

12. The system of claim 11 wherein said database used in said remote database is the Automatic Identification System (AIS).

13. The system of claim 11 wherein said instructions further comprise the step of:
    G1) filtering said satellite image from said step A) to remove said imaged vessels that are actually man-made objects and land masses, said step G1 occurring before said step E).

14. The system of claim 11 wherein said instructions further comprise the step of:
    G2) updating said imagery position data to account for vessel wakes, said step G2) occurring before said step E).

15. The system of claim 11 wherein said step F) of said instructions is accomplished using a Chi-Squared probability analysis.

16. The system of claim 11 wherein said instructions further comprise the step of:
    H) alerting an operator if at least one of said vessels does not have assigned AIS reporting data.

17. The system of claim 11 wherein said instructions further comprise the step of:
    I) alerting an operator if said vessel position data is not assigned to at least one said vessel after completion of said step F).

18. The system of claim 11 wherein said step D) of said instructions further comprises the step of:
    D1) consolidating vessel position data that pertains to the same unique vessel.

19. The system of claim 18, wherein said step D1) of said instructions is accomplished by retrieving at least one position data point within said time window.

20. The system of claim 19, wherein said step D1) of said instructions is accomplished by retrieving at least one position data point prior to said TOI and one position data point after said TOI.

* * * * *